(12) United States Patent
Yang et al.

(10) Patent No.: US 10,753,247 B2
(45) Date of Patent: Aug. 25, 2020

(54) BI-METALLIC OXIDATION CATALYST MATERIALS AND APPURTENANT DEVICES AND SYSTEMS

(71) Applicant: GM GLOBAL TECHNOLOGY OPERATIONS LLC, Detroit, MI (US)

(72) Inventors: Ming Yang, Novi, MI (US); Ryan J. Day, Waterford, MI (US); Xingcheng Xiao, Troy, MI (US); Gongshin Qi, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 15/902,464

(22) Filed: Feb. 22, 2018

(65) Prior Publication Data

US 2019/0257232 A1  Aug. 22, 2019

(51) Int. Cl.
*B01J 23/42* (2006.01)
*B01J 23/44* (2006.01)
*B01J 23/46* (2006.01)
*B01J 23/50* (2006.01)
*B01J 23/52* (2006.01)
*B01J 23/75* (2006.01)
*B01J 23/755* (2006.01)
*F01N 3/10* (2006.01)
*C01B 32/50* (2017.01)
*C01B 21/04* (2006.01)
*C01B 32/40* (2017.01)

(52) U.S. Cl.
CPC ............... *F01N 3/101* (2013.01); *B01J 23/42* (2013.01); *B01J 23/44* (2013.01); *B01J 23/46* (2013.01); *B01J 23/50* (2013.01); *B01J 23/52* (2013.01); *B01J 23/75* (2013.01); *B01J 23/755* (2013.01); *C01B 21/0422* (2013.01); *C01B 32/40* (2017.08); *C01B 32/50* (2017.08)

(58) Field of Classification Search
CPC ... B01J 23/42; B01J 23/44; B01J 23/46; B01J 23/50; B01J 23/52; B01J 23/75; B01J 23/755; F01N 3/101
See application file for complete search history.

(56) References Cited

U.S. PATENT DOCUMENTS

| | | | | |
|---|---|---|---|---|
| 3,901,827 A | * | 8/1975 | Sinfelt | B01J 23/46 502/245 |
| 3,956,191 A | * | 5/1976 | Cusumano | B01J 23/40 502/330 |
| 5,008,234 A | * | 4/1991 | Ozin | B01J 23/42 502/259 |

(Continued)

*Primary Examiner* — Cam N. Nguyen (57) ABSTRACT

Bimetallic oxidation catalyst devices include a support body, one or more metal A bulk deposits disposed on the support body, and a plurality of metal B atomic clusters disposed on the surface of each of the metal A bulk deposits. Metal A and metal B are different metals each selected from the group consisting of platinum group metals (PGM), Ag, Au, Ni, Co, and Cu, and substantially no metal B is deposited on the support body. At least 85% by weight of the metal B atomic clusters comprise up to 10 atoms and the maximum metal B atomic cluster size is 200 metal B atoms. The combined loading of metal A and metal B can be less than 1.5% by weight relative to the weight of the support body. Metal A can include Pd, Rh, Rh, or Pd, and metal B can include Pt, Pt, Ag, or Ag.

18 Claims, 5 Drawing Sheets

(56) References Cited

U.S. PATENT DOCUMENTS

| | | | |
|---|---|---|---|
| 7,097,933 B2* | 8/2006 | Ovshinsky | B01J 23/8892 |
| | | | 429/499 |
| 7,569,508 B2* | 8/2009 | Zhou | B01J 23/42 |
| | | | 208/133 |
| 7,767,610 B1* | 8/2010 | Coker | H01M 4/926 |
| | | | 502/60 |
| 8,053,387 B2* | 11/2011 | Flytzani-Stephanopoulus | |
| | | | B01J 23/52 |
| | | | 502/302 |
| 8,143,189 B2* | 3/2012 | Vajda | B01J 23/50 |
| | | | 502/300 |
| 8,148,293 B2* | 4/2012 | Vajda | B01J 23/50 |
| | | | 502/300 |
| 8,288,311 B2* | 10/2012 | Dhingra | B01J 23/52 |
| | | | 502/243 |
| 8,371,841 B2* | 2/2013 | Penninger | B29C 33/26 |
| | | | 425/451.4 |
| 9,034,165 B2* | 5/2015 | Wang | B01J 21/18 |
| | | | 205/102 |
| 9,186,653 B2* | 11/2015 | Mukerjee | B82Y 30/00 |
| 9,689,085 B2* | 6/2017 | Wang | B01J 21/18 |
| 9,849,445 B2* | 12/2017 | Vajda | B01J 23/892 |
| 2014/0227166 A1* | 8/2014 | Desmedt | B01J 37/18 |
| | | | 423/584 |
| 2014/0318980 A1* | 10/2014 | Lopez Quintela | B01D 53/885 |
| | | | 205/340 |

* cited by examiner

BI-METALLIC OXIDATION CATALYST MATERIALS AND APPURTENANT DEVICES AND SYSTEMS

INTRODUCTION

Platinum group metals (PGMs), particularly platinum and palladium, catalysts are commonly used in gasoline and diesel automotive emissions aftertreatment systems to oxidize various constituents of exhaust gas, such as carbon monoxide (CO), unburned and partially-burned hydrocarbons (HC), and nitrogen monoxide (NO). Such catalysts typically comprise a bi-metallic alloy (e.g., a Pt-Pd alloy) disposed on a substrate (e.g., an alumina substrate).

SUMMARY

A catalytic device is provided. The device can include a support body, one or more metal A bulk deposits disposed on the support body, and a plurality of metal B atomic clusters disposed substantially on the surface of each of the metal A bulk deposits. Metal A and metal B can be different metals each selected from the group consisting only of platinum group metals (PGM), Ag, Au, Ni, Co, and Cu, and substantially no metal B is deposited on the support body. Metal A and metal B can be different metals each selected from the group consisting of only PGM, Ag, and Au. Metal A can include Pd, Rh, Rh, or Pd, and metal B can include Pt, Pt, Ag, or Ag. Metal A can be selected from the group consisting only of Ni, Co, and Cu, and metal B can be selected from the group consisting only of Pt, Pd, and Rh. Less than 10% by weight of metal B atomic clusters can be disposed directly on the support body. Metal B atomic clusters can be deposited onto the surface of the one or more metal A bulk deposits by contacting the support body and the one or more metal A bulk deposits with a solution or slurry comprising complexed metal B ions. Prior to the deposition of metal B atomic clusters on to the surface of the one or more metal A bulk deposits, the support body can be pH-adjusted to exhibit a charge which is repulsive to the metal B ions in the slurry or solution. One or more metal A bulk deposits can have diameters of about 0.2 nanometers to about 3 nanometers. At least 85% by weight of the metal B atomic clusters can have up to 10 atoms. The catalytic device can be configured to receive exhaust gas generated by an internal combustion engine.

A catalytic device is provided. The device can include a support body, one or more metal A bulk deposits disposed on the support body, and a plurality of metal B atomic clusters disposed on each of the metal A bulk deposits. At least 85% by weight of the metal B atomic clusters have up to 10 metal B atoms, and the maximum metal B atomic cluster size is 200 metal B atoms. Metal A and metal B are different metals each selected from the group consisting only of platinum group metals (PGM), Ag, Au, Ni, Co, and Cu. At least 85% by weight of the metal B atomic clusters can have up to 5 metal B atoms. The maximum metal B atomic cluster size can be 50 atoms. Substantially no metal B can be deposited on the support body. Metal A and metal B can be different metals each selected from the group consisting only of PGM, Ag, and Au. The internal combustion engine can power a vehicle.

A bimetallic oxidation catalyst device is provided. The device is configured to treat exhaust gas generated by a gasoline internal combustion engine. The device includes a canister, a non-metal support body disposed within the canister, a plurality of metal A bulk deposits disposed on the support body, one or more metal A bulk deposits disposed on the support body, and a plurality of metal B atomic clusters disposed on each of the metal A bulk deposits. At least 85% by weight of the metal B atomic clusters have up to 10 metal B atoms, and the maximum metal B atomic cluster size is 200 metal B atoms. Metal A and metal B are different metals each selected from the group consisting only of platinum group metals (PGM), Ag, Au, Ni, Co, and Cu. The combined loading of metal A and metal B can be less than 1.5% by weight relative to the weight of the support body. The gasoline internal combustion engine can power a vehicle. The support body can be one or more of alumina, silica, ceria, zirconia, titania, lanthana, and zeolite.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Bi-metallic, and generally polymetallic, metal oxidation catalysts typically comprise irregular metallic distributions that can lead unpredictable, low, or non-optimized catalytic activity. In general, uniform and/or fine dispersion of the two metals in a bi-metallic catalyst maximizes the catalytic activity thereof. In a particular example, maximizing interactions between Pt and Pd (e.g., electronic and/or reduction-oxidation interactions, among others) is critical to effecting the unusually high activity of Pt—Pd catalysts. For example, metallic Pd is highly active for hydrocarbon oxidation relative to Pd oxides (e.g., PdO), and contact with Pt encourages existence of Pd in a metallic state.

Provided herein are oxidation catalyst materials and appurtenant devices which exhibit high catalytic activity and efficient usage of catalytic metals. The oxidation catalyst materials can be manufactured using energy-efficient methods which combine desired catalytic metals with atomic precision.

Figure 1:
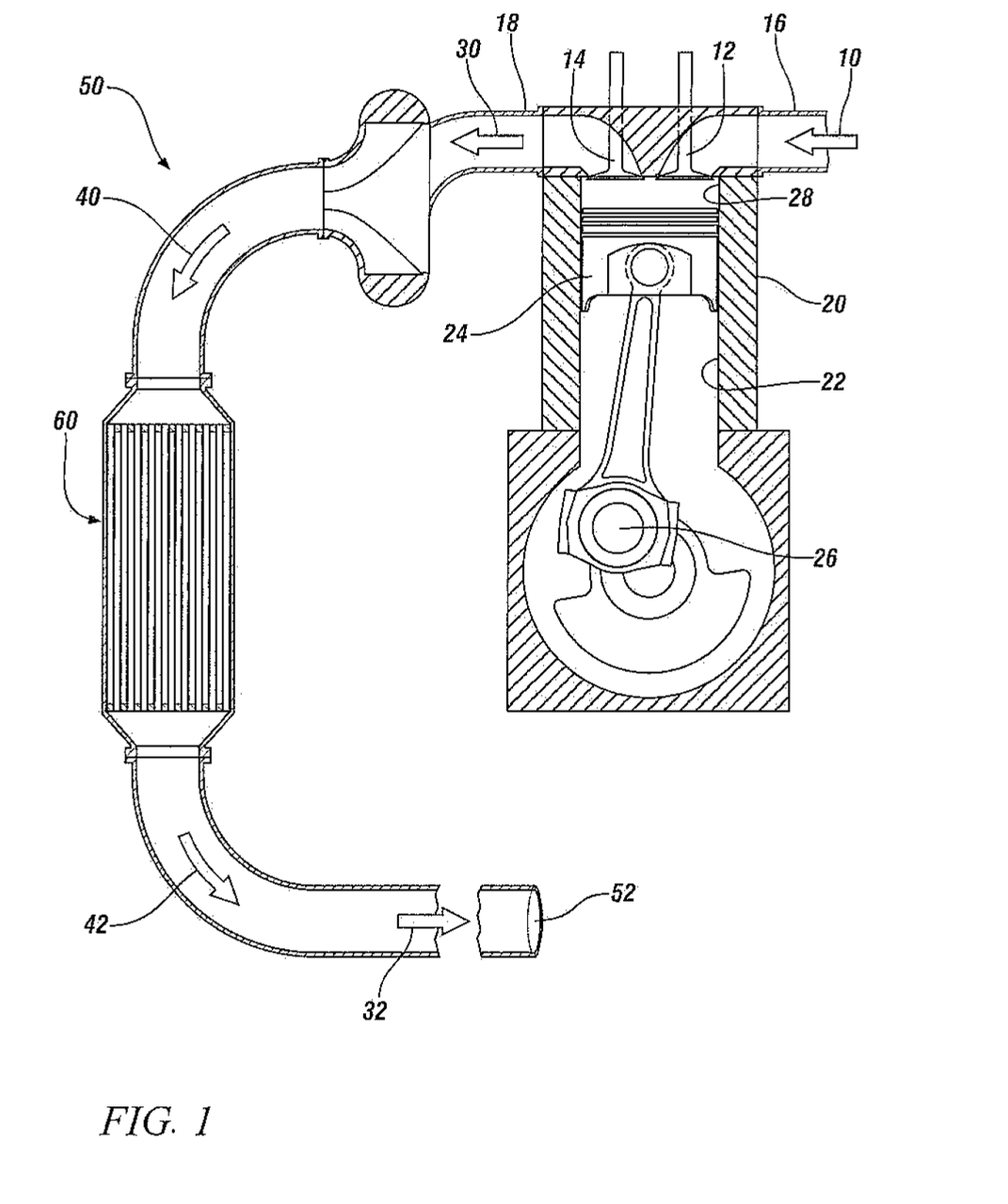
FIG. 1 illustrates an exhaust gas treatment system appurtenant to an internal combustion engine, according to one or more embodiments.

FIG. 1 illustrates an oxidation catalyst device (OC) 60 appurtenant to exhaust gas treatment system 50. System 50 is configured to receive and treat exhaust gas 30 generated by internal combustion engine (ICE) 20. OC 60 generally represents close-coupled OCs, underfloor OCs, and others as will be known by those of skill in the art. A mixture of air and fuel 10 enters ICE 20 and exits as an exhaust gas 30. The exhaust gas stream 40 then passes through the exhaust gas treatment system 50. In general, OC 60 is configured to effect oxidation of exhaust gas 30 constituents, including carbon monoxide (CO), hydrocarbons (HC), and one or more nitrogen oxide (NOx) species. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

ICE 20 can be configured to power a vehicle (not shown). The multi-cylinder, reciprocating piston ICE 20 may be a charge compression ICE (i.e., diesel ICE), a spark ignition direct injection ICE (i.e., gasoline ICE, which may or may not contain an in-cylinder fuel injector), or a homogeneous charge compression ignition ICE. Each of these types of ICEs includes one or more cylinders 22 that accommodate reciprocating piston heads 24 connected to a crankshaft 26. Located above each piston head 24 is a combustion chamber 28 that receives a mixture of air and fuel 10 through an intake valve 12 at specifically timed intervals. The spark or compression assisted ignition of the air and fuel mixture 10 in the combustion chambers 28 invokes rapid downward linear movement of their respective piston heads 24 to drive rotation of the crankshaft 26. The reactive upward movement of each piston head 24 expels the combustion products from each combustion chamber 28 through an exhaust valve 14.

ICE 20 is supplied with a continuous air flow at a variable mass flow rate responsive to ICE performance demands (e.g., pressing and depressing a foot pedal located in the driver-side compartment to achieve desired vehicle speed and acceleration). A quantity of fuel is intermittently injected into an incoming air flow just upstream from the ICE 20, as dictated, for example, by an ICE control strategy, to produce a mixture of air and fuel that exhibits the instantly desired air to fuel mass ratio (not shown). For example, the quantity of fuel injected into the incoming air flow can be controlled to maintain a lean air to fuel mass ratio or a rich air to fuel mass ratio, or to switch between the two states.

The mixture of air and fuel 10 enters an intake manifold 16 of the ICE 20 and exits as an exhaust gas 30 through the exhaust manifold 18. The intake manifold 16 delivers the air and fuel mixture 10 into the combustion chambers 28 through the intake valve 12 and then to the cylinders 22 of the ICE 20. The air and fuel mixture 10 is compressed, heated, and thereby ignited to power the reciprocating piston heads 24 in the cylinders 22 of the ICE 20. The spent combustion products are expelled from the cylinders 22 of the ICE 20 by the exhaust strokes of the pistons 24 and into the exhaust manifold 18 through the exhaust valve 14. The exhaust manifold 18 delivers the combustion products to the exhaust gas treatment system 50 as the exhaust gas 30. The treatment system 50 communicates the exhaust gas 30 to OC 60 for the effective oxidation of exhaust gas 30 constituents (e.g., CO and HC).

Figure 2:
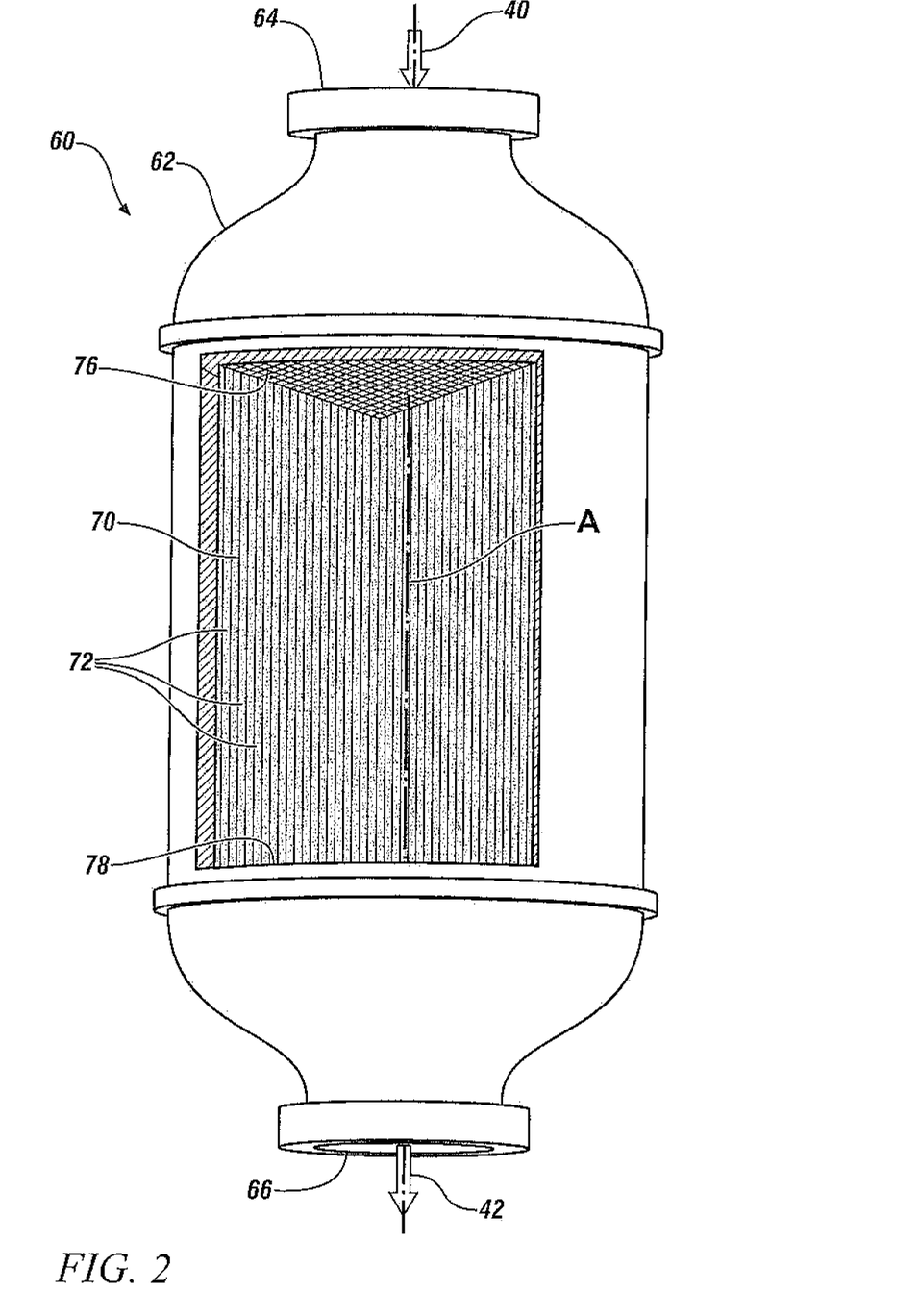
FIG. 2 illustrates an oxidation catalyst device, according to one or more embodiments.
Figure 3:
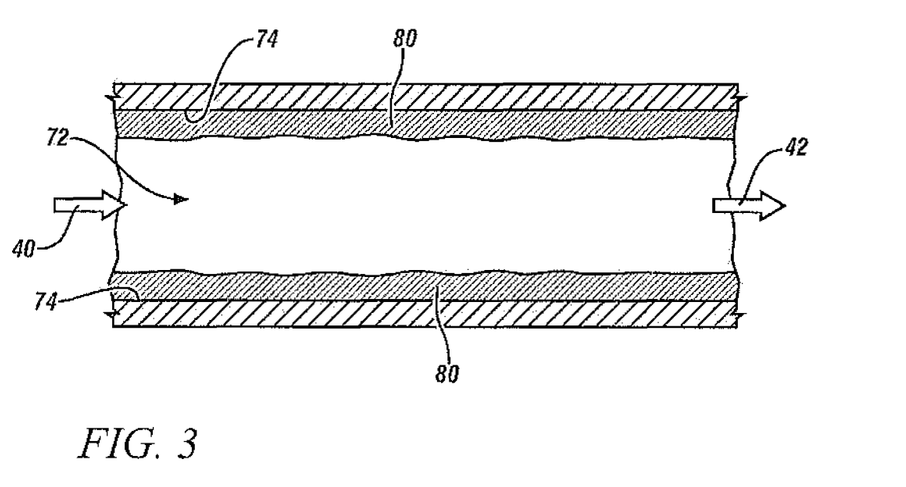
FIG. 3 illustrates a cross sectional view of an oxidation catalyst device, according to one or more embodiments.

As shown in FIGS. 1-3, the exhaust gas stream 40 enters OC 60 and passes through the support body 70, which can comprise flow-through channels 72, for example, defined by walls 74. OC 60 comprises oxidation catalyst material disposed on the support body 70. Support body 70 is a generally porous, non-metal (i.e., a material which is not an elemental metal or metal alloy) material, such as a metal oxide or ceramic material. In some embodiments, support body 70 comprises one or more of alumina, silica, ceria, zirconia, titania, lanthana, and zeolite. The high-surface area of the channel walls 74 creates sufficient contact between the exhaust gas 30 and the oxidation catalyst material for the desired oxidation reactions to occur. The exhaust gas treatment system 50 then communicates the exhaust gas stream 40 from OC 60 as a treated exhaust gas stream 42. The treated exhaust gas 32 is expelled from the treatment system 50 through a vent 52 (e.g., a vehicle tail pipe), for example to the ambient atmosphere.

A suitable OC 60 for the catalyzed oxidation reactions disclosed herein is shown in FIG. 2, and is piped within the exhaust gas treatment system 50 to facilitate continuous passage of the exhaust gas stream 40 therethrough. OC 60 can further include a shell or canister 62 comprising a substantially inert material, relative to the exhaust gas constituents, such as stainless steel or other metal alloys. Canister 62 is shaped with an upstream inlet 64 for exhaust gas 30 entry, and a downstream outlet 66 for exhaust gas 30 expulsion. The body of the canister 62 can be round or elliptical in cross-section, although other configurations are practicable, and sized to hold a support body 70 to which oxidation catalyst material is applied. In FIG. 2, a wedge portion of the canister 62 and the catalyst-coated support body 70 have been cut-away to better reveal the internal channels 72 extending therethrough.

The support body 70 is shown in FIG. 2 as a honeycomb-shaped monolith with an inlet face 76 and an outlet face 78 transverse to the exhaust gas stream 40 (that is, along the flow axis A), and includes several small, square, parallel flow-through channels 72 defined by walls 74 which extending longitudinally from the inlet face 76 to the outlet face 78 of the support body. Since each channel 72 is small in cross-section for admitting the exhaust gas stream 40, the inlet face 76 of the support body is sized to provide a suitable number of channels 72 to collectively accommodate a desired flow rate for the exhaust gas stream 40. For example, the support body 70 may contain about four-hundred channels 72 per square inch of inlet face 76 cross-sectional area. While extruded ceramic, honeycomb-shaped monoliths have proven effective and durable for oxidation catalysts, other catalyst support bodies of different materials and geometric configurations may be used and are germane to the embodiments herein.

Oxidation catalyst material are generally disposed on support body 70. In a non-limiting example, as shown in FIG. 3, small particles of the oxidation catalyst material, depicted by layer 80, are deposited on the walls 74 of the flow-through channels 72. In general, bimetallic catalysts effect oxidation of target species (e.g., CO, HCs) via redox reactions that occur between contiguous catalytic metals (e.g., Pt, Pd). Accordingly, suitable bimetallic oxidation catalysts maximize the accessibility (i.e., surface area) of contiguous catalytic metal formations such that contact with oxidizable feeds (e.g., exhaust gas 30) is similarly maximized.

Figure 4:
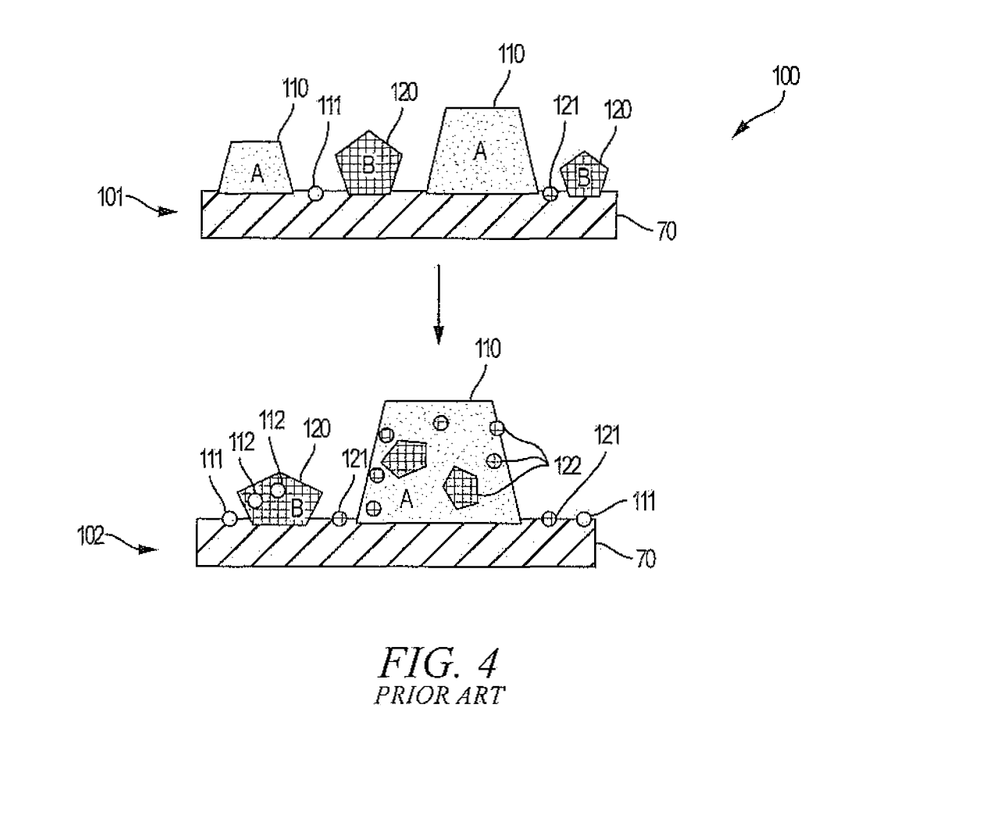
FIG. 4 illustrates a prior art method for manufacturing an oxidation catalyst material, according to one or more embodiments.

FIG. 4 illustrates a prior art method 100 commonly used to deposit and process a bi-metallic catalytic material on a support body 70. Bulk deposits 110, 120 of metal A and metal B, respectively, are allocated 101 onto support body 70. Known processes such as impregnation, ion adsorption, and precipitation can be used, for example. For example, bulk deposits 110, 120 are typically at least about 2 nm in diameter, and up to about 5 nanometers, or up to about 10 nanometers in diameter. Allocation of 101 bulk deposits 110,120 often results in undesired errant depositions 111, 121 of metal A and metal B, respectively, onto the support body 70. Errant depositions 111,121 are not contiguous with a second catalytic metal and therefore do not effectively contribute to the catalytic activity of an OC 60 to which they are appurtenant. Subsequent to allocation 101, bulk deposits are alloyed 102 to intersperse metal A and metal B between the bulk deposits. Alloying 102 is an energy-intensive process that occurs in the presence of hydrogen at high temperatures, yielding randomized interspersed exchanges 112, 122 of metal A and metal B, respectively. Exchanges 112, 122 widely vary in size/weight, and can impregnate within the bulk deposits 110,120 in a manner that precludes their accessibility for catalytic activity. Further errant depositions 111, 121 of metal A and metal B also occur.

Figure 5:
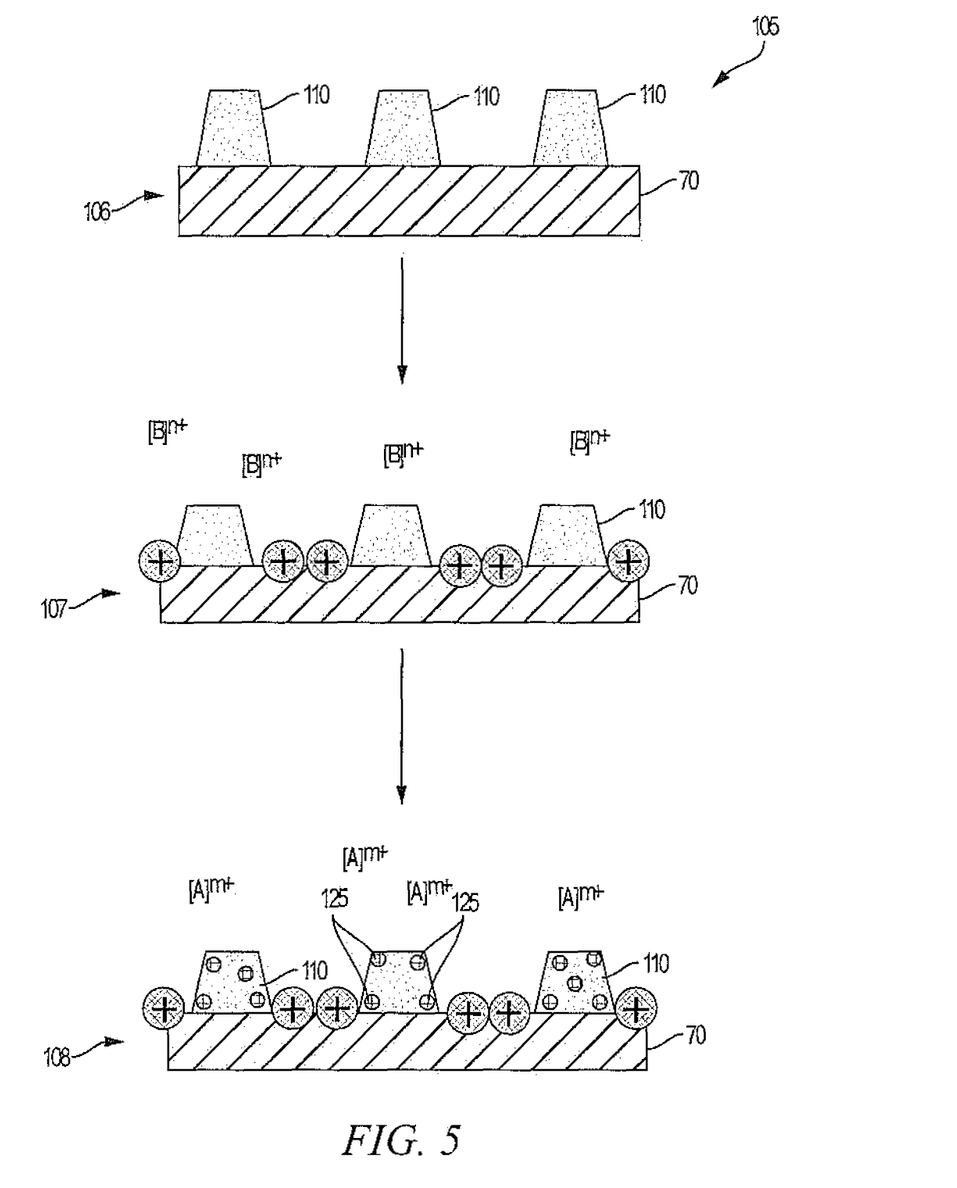
FIG. 5 illustrates a method for manufacturing an oxidation catalyst material, according to one or more embodiments.

FIG. 5 illustrates a facile method 105 for producing high efficiency bimetallic catalytic structures and systems which is more energy efficient and precise than method 100. Bulk deposits 110 of metal A are allocated 106 onto support body 70, for example using techniques described above. Bulk deposits 110 which are treated per method 105 can be as small as about 0.2 nanometers in diameter. In some embodiments, bulk deposits 110 which are treated per method 105 can be about 0.2 to about 2 nanometers in diameter, about 0.2 to about 2.5 nanometers in diameter, or about 0.2 to about 3 nanometers in diameter. Bulk deposits 110 can be optionally calcinated to produce superficial elemental metal on bulk deposits 110. If required, the surface of bulk deposits 110 are reduced for example by an optional additional or alterative treatment with/to calcination. Reducing treatments can include exposure to $H_2$ at temperatures below about 200° C., exposure to a $NaBH_4$ solution, exposure to $H_2O_2$ in solution, or exposure to ethanol, among others. The support body 70 and its appurtenant bulk deposits 110 are exposed 107 to a solution or slurry comprising metal B ions. Metal B ions can be complexed with various ligands. The solution or slurry can be temperature-controlled. Prior to exposure 107 of the solution or slurry, the pH of the catalyst support 70 can be adjusted (e.g., by applying acids or bases) to exhibit a charge which is repulsive to metal B ions. For example, if metal B ions in the solution or slurry are positive, the catalyst support 70 will be disposed to exhibit a positive charge.

Metal A and metal B are suitably chosen to exhibit noticeably different electronegativity such that sufficient redox exchange between the two metals may occur (e.g., while catalyzing the oxidation of CO and/or HC). For example, metal A and metal B suitably will differ in electronegativity by at least about 0.1V. Metal A and B can comprise different metals selected from the group comprising platinum group metals (PGM), Ag, Au, Ni, Co, and Cu. PGM can include ruthenium, platinum, palladium, rhodium, and iridium. In some embodiments, PGM refer to metals selected from the group consisting of Pd, Pt, Rh, Ru, and Ir.

Galvanic exchange 108 thereafter occurs between the metal A bulk deposits 110 and the metal B ions in the solution or slurry, effecting deposition of atomic clusters 125 of metal B on the surface of the metal A bulk deposits 110. During galvanic exchange 108, the solution or slurry may comprise metal A ions and metal B ions. Deposition of metal B ions (i.e., as atomic clusters 125) may be highly controlled by many aspects. In a first aspect, the repulsive charge of support body 70 ensures that no, or substantially no (i.e., negligible), errant depositions (e.g., 121) of metal B occur thereto. In a second aspect, galvanic exchange 108 via the solution or slurry effects deposition of metal B atomic clusters 125 entirely, or substantially, to the surface of bulk deposits 110, rather than inaccessibly imbedding metal B into bulk deposits 110 of metal A. Accordingly, the locations of metal B atomic clusters 125 are substantially optimized for catalytic activity.

In a third aspect, the complexing ligands shift the free energy of the galvanic exchange such that no galvanic exchange occurs below a particular temperature. Accordingly, ligand selection and temperature control of the solution or slurry during galvanic exchange 108 allow for strict control of metal B deposition rate and mass. For the purposes of non-limiting illustration, where metal B comprises Pt, a suitable Pt-ligand complex can comprise one or more of Tetraammineplatinum(II) hydrogen carbonate, Tetraammineplatinum(II) chloride monohydrate, Tetraammineplatinum(II) nitrate, Tetraammineplatinum(II) hydroxide, Tetraammineplatinum(II) chloride, or Tetraammineplatinum(II) chloride monohydrate, among others. For the purposes of non-limiting illustration, where metal B comprises Pd, a suitable Pd-ligand complex can comprise one or more of Palladium(II) acetate, Palladium(II) nitrate, Diamminepalladium(II) nitrite, Tetraamminepalladium(II) chloride monohydrate, or Tetraamminepalladium(II) bromide, among others. For the purposes of non-limiting illustration, where metal B comprises Rh, a suitable rh-ligand complex can comprise one or more of Rhodium(III) chloride hydrate, Rhodium(III) iodide, Rhodium(II) acetate, Rhodium(III) chloride, or Rhodium(III) nitrate, among others.

Subsequent to galvanic exchange 108, the support body 70 and its appurtenant metal deposits (e.g., bulk deposits 110 and atomic clusters 125) can be rinsed to provide a highly catalytically active and stable bimetallic OC 60. In reference to FIG. 3, oxidation catalyst material 80 can comprise one or a plurality of bulk deposits 110 superficially impregnated with atomic clusters 125. In some embodiments, the combined loading of metal A and metal B is less than about 1.5%, less than about 1.25%, or less than about 1% by weight relative to the weight of the support body In some embodiments, the oxidation catalyst material 80 comprises configurations of metal A and metal B as described herein, wherein metal A and metal B are different metals each selected from the group consisting of PGM, Ag, Au, Ni, Co, and Cu. In some embodiments, the oxidation catalyst material 80 comprises configurations of metal A and metal B as described herein, wherein metal A and metal B are different metals each selected from the group consisting of PGM, Ag, and Au. In some embodiments, the oxidation catalyst material 80 comprises configurations of metal A and metal B as described herein, wherein metal A comprises Pd, Rh, Rh, or Pd, and metal B comprises Pt, Pt, Ag, or Ag. In some embodiments, the oxidation catalyst material 80 comprises configurations of metal A and metal B as described herein, wherein metal A is selected from the group consisting of Ni, Co, and Cu, and metal B is selected from the group consisting of Pt, Pd, and Rh.

Atomic clusters 125 are substantially uniform in size, and are disposed substantially at least on the surface of each of the metal A bulk deposits 110 (i.e., no more than 10% by weight of metal B is directly disposed on the surface of support body 70). The metal B atomic clusters 125 can be deposited onto the surface of metal A bulk deposits 110 via galvanic exchange. The metal B atomic clusters 125 can be deposited onto the surface of the metal A bulk deposits 110 by contacting the latter with a solution or slurry comprising complexed metal B ions.

In some embodiments, atomic clusters 125 generally each comprise at most 10 metal B atoms. For example, at least about 85% or at least about 90% by weight of the metal B atomic clusters 125 comprise at most 10 atoms. In some embodiments, atomic clusters 125 generally each comprise at most 5 metal B atoms. For example, at least about 85% or at least about 90% by weight of the metal B atomic clusters 125 comprise at most 5 atoms. The maximum size of any metal B atomic cluster 125 is 200 metal B atoms, in some embodiments. In some embodiments, the maximum size of any metal B atomic cluster is at most about 100 metal B atoms, at most about 50 metal B atoms or at most about 20 metal B atoms.

EXAMPLE 1

Figure 6A:
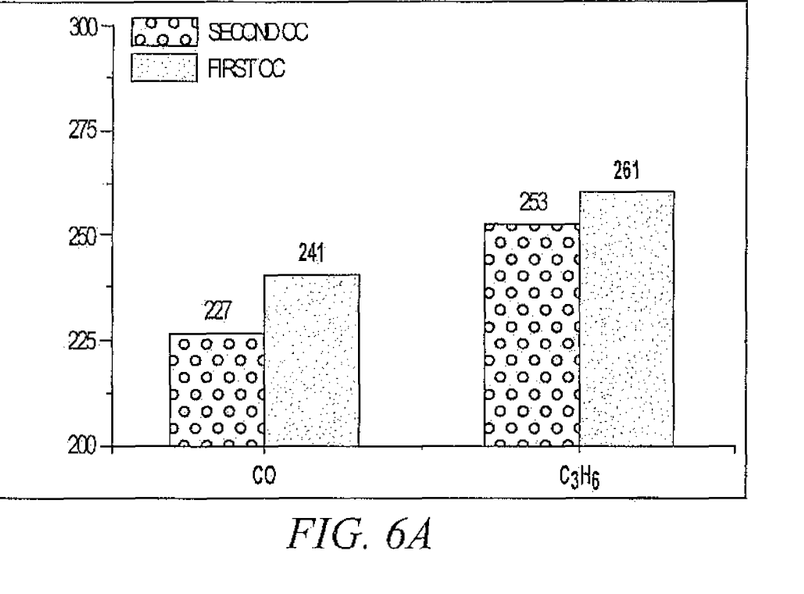
FIG. 6A illustrates light-off temperature data for two oxidation catalyst devices, according to one or more embodiments.
Figure 6B:
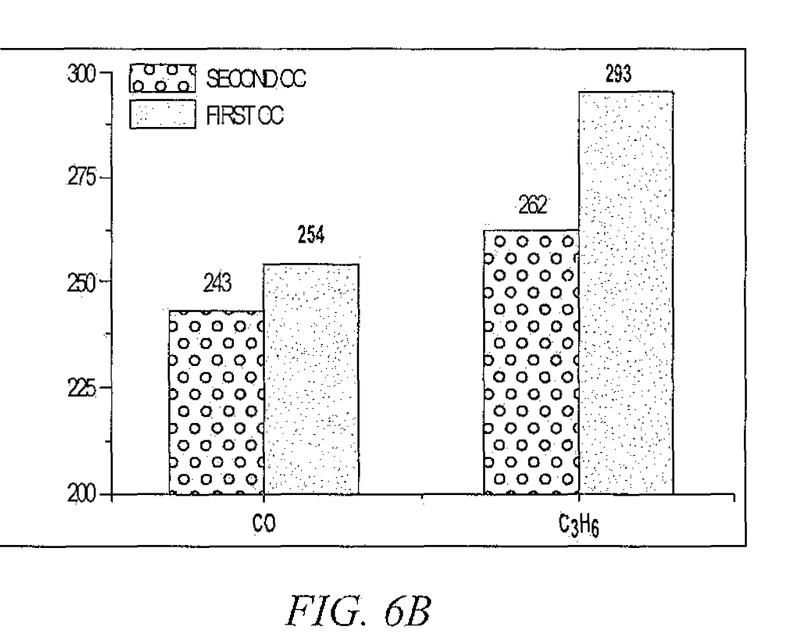
FIG. 6B illustrates light-off temperature data for two oxidation catalyst devices, according to one or more embodiments.

A first conventional OC and a second OC comprising oxidation catalyst material conforming the embodiments disclosed herein were aged and exposed to exhaust gas streams to determine the oxidation performance of each device. The first OC comprised a Pd catalyst on an $Al_2O_3$ support body, with a catalytic material loading of 1.5% relative to the support body. The second OC comprised a $Pd_{20}Pt_1$ catalyst on an $Al_2O_3$ support body, with a catalytic material loading of 0.75% relative to the support body. In two trials, each OC was exposed to exhaust gas streams comprising 5000 ppm CO, 500 ppm $C_3H_6$, 1.0% O2, 5% $H_2O$, and the balance $N_2$. The exhaust gas was delivered to the OCs at a flow rate of 1,500,000 $cm^3$ per gram of catalytic material per hour. The temperature of the OC-exhaust gas system from ramped from 100° C. to 350° C. at a rate of 2° C./min. FIGS. 6A-B illustrate CO and $C_3H_6$ light-off temperature data for each OC, wherein the light-off temperature represents the temperature at which the OC oxidizes 50% of the target species.

FIG. 6A illustrates data for the first OC and second OC aged for 48 hours at 950° C. prior to testing. The second OC exhibited lower light-off temperatures than the first OC for both CO and $C_3H_6$, even with only half the catalytic loading relative to the first OC.

FIG. 6B illustrates data for the first OC and second OC aged for 48 hours at 1050° C. prior to testing. The second OC exhibited lower light-off temperatures than the first OC for both CO and $C_3H_6$, even with only half the catalytic loading relative to the first OC. The relative light-off temperature changes between OCs in FIG. 6A (with light thermal aging) and FIG. 6B (with heavy thermal aging) indicate a much higher thermal stability of the second OC catalytic material relative to that of the conventional first OC.

The oxidation catalysts of the present invention have utility for applications other than the treatment of diesel or gasoline ICE exhaust, and may be useful for oxidation of gas-borne oxidizable components generally, such as the exhaust of compressed natural gas ICEs, ethanol-fueled ICEs, compressors, and gas turbines, among others.

The exhaust gas may be exposed to other devices or mechanical equipment, not expressly shown in FIG. 1, that may or may not help produce the treated exhaust gas stream 42. These devices include, for example, another oxidation catalyst, a three-way catalyst, a particulate filter, a selective catalytic reduction (SCR) catalyst device, an exhaust gas recirculation line, a turbocharger turbine, a muffler, and/or a resonator. Skilled artisans will undoubtedly know of and understand these and many other possible additional appurtenant devices. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A catalytic device, the device comprising:
    a support body;
    one or more metal A bulk deposits disposed on the support body, and
    a plurality of metal B atomic clusters disposed on the surface of at least one of the metal A bulk deposits, wherein less than 10% by weight of metal B atomic clusters are disposed directly on the support body;
    wherein metal A and metal B are different metals each selected from the group consisting of platinum group metals (PGM), Ag, Au, Ni, Co, and Cu.

2. The catalytic device of claim 1, wherein metal A and metal B are different metals each selected from the group consisting of PGM, Ag, and Au.

3. The catalytic device of claim 1, wherein metal A comprises Pd and metal B comprises Pt or Ag.

4. The catalytic device of claim 1, wherein metal A is selected from the group consisting of Ni, Co, and Cu, and metal B is selected from the group consisting of Pt, Pd, and Rh.

5. The catalytic device of claim 1, wherein the metal B atomic clusters are deposited onto the surface of the one or more metal A bulk deposits by contacting the support body and the one or more metal A bulk deposits with a solution or slurry comprising complexed metal B ions.

6. The catalytic device of claim 5, wherein prior to the deposition of metal B atomic clusters on to the surface of the one or more metal A bulk deposits, the support body is pH-adjusted to exhibit a charge which is repulsive to the metal B ions in the slurry or solution.

7. The catalytic device of claim 1, wherein the one or more metal A bulk deposits comprises diameters of about 0.2 nanometers to about 3 nanometers.

8. The catalytic device of claim 1, wherein at least 85% by weight of the metal B atomic clusters comprise up to 10 atoms.

9. The catalytic device of claim 1, wherein the support body consists of a metal oxide and/or a ceramic material.

10. A catalytic device, the device comprising:
   a support body;
   one or more metal A bulk deposits disposed on the support body, and
   a plurality of metal B atomic clusters disposed on at least one of the metal A bulk deposits, wherein at least 85% by weight of the metal B atomic clusters comprise up to 10 metal B atoms, and the maximum metal B atomic cluster size is 200 metal B atoms;
   wherein metal A and metal B are different metals each selected from the group consisting of platinum group metals (PGM), Ag, Au, Ni, Co, and Cu.

11. The catalytic device of claim 10, wherein at least 85% by weight of the metal B atomic clusters comprise up to 5 metal B atoms.

12. The catalytic device of claim 10, wherein the maximum metal B atomic cluster size is 50 atoms.

13. The catalytic device of claim 10, wherein less than 10% by weight of metal B atomic clusters are disposed directly on the support body.

14. The catalytic device of claim 10, wherein metal A and metal B are different metals each selected from the group consisting of PGM, Ag, and Au.

15. A bimetallic oxidation catalyst device configured to treat exhaust gas generated by a gasoline internal combustion engine, the device comprising:
   a canister;
   a non-metal support body disposed within the canister;
   a plurality of metal A bulk deposits disposed on the support body; and
   a plurality of metal B atomic clusters disposed on at least one of the metal A bulk deposits, wherein at least 85% by weight of the metal B atomic clusters comprise up to 10 metal B atoms, and the maximum metal B atomic cluster size is 200 metal B atoms;
   wherein metal A and metal B are different metals each selected from the group consisting of platinum group metals (PGM), Ag, Au, Ni, Co, and Cu.

16. The bimetallic oxidation catalyst device of claim 15, wherein the combined loading of metal A and metal B is less than 1.5% by weight relative to the weight of the support body.

17. The bimetallic oxidation catalyst device of claim 15, wherein the gasoline internal combustion engine powers a vehicle.

18. The bimetallic oxidation catalyst device of claim 15, wherein the support body comprises one or more of alumina, silica, ceria, zirconia, titania, lanthana, and zeolite.

* * * * *